(12) United States Patent
Saars et al.

(10) Patent No.: US 11,588,361 B2
(45) Date of Patent: Feb. 21, 2023

(54) INFERIOR PERMANENT MAGNET ROTOR FOR A REFRIGERANT COMPRESSOR

(71) Applicant: Secop GmbH, Flensburg (DE)

(72) Inventors: Thomas Saars, Großenwiehe (DE); Finn Mortensen, Soenderborg (DK)

(73) Assignee: SECOP GMBH, Flensburg (DE)

( * ) Notice: Subject to any disclaimer, the term of this patent is extended or adjusted under 35 U.S.C. 154(b) by 176 days.

(21) Appl. No.: 16/992,745

(22) Filed: Aug. 13, 2020

(65) Prior Publication Data
US 2021/0050754 A1 Feb. 18, 2021

(30) Foreign Application Priority Data

Aug. 14, 2019 (EP) ..................... 19191628

(51) Int. Cl.
| | |
|---|---|
| *H02K 1/27* | (2022.01) |
| *H02K 1/04* | (2006.01) |
| *H02K 1/276* | (2022.01) |
| *F25B 1/04* | (2006.01) |
| *H02K 15/03* | (2006.01) |

(52) U.S. Cl.
CPC ............... *H02K 1/276* (2013.01); *F25B 1/04* (2013.01); *H02K 15/03* (2013.01)

(58) Field of Classification Search
CPC .......... H02K 1/276; H02K 15/03; H02K 7/14; H02K 1/246; H02K 1/2706; F25B 1/04
See application file for complete search history.

(56) References Cited

U.S. PATENT DOCUMENTS

| | | | |
|---|---|---|---|
| 9,712,006 B2* | 7/2017 | Kondou | H02K 1/2766 |
| 2002/0175583 A1* | 11/2002 | Kikuchi | H02K 16/02 |
| | | | 310/156.56 |
| 2002/0175584 A1 | 11/2002 | Koharagi et al. | |
| 2016/0233748 A1 | 8/2016 | Matsunaga et al. | |

FOREIGN PATENT DOCUMENTS

| | | |
|---|---|---|
| EP | 1 261 104 | 11/2002 |
| JP | 2011-147259 | 7/2011 |

OTHER PUBLICATIONS

Europe Search Report/Office Action conducted in counterpart Europe Appln. No. 19 19 1628 (dated Jan. 17, 2020).

* cited by examiner

*Primary Examiner* — Thomas Truong
(74) *Attorney, Agent, or Firm* — Greenblum & Bernstein, P.L.C.

(57) ABSTRACT

An interior permanent magnet rotor, for a drive unit disposed in the interior of a hermetically sealed housing of a refrigerant compressor, whereas the rotor includes a first axial section with permanent magnets, followed by a second axial section without permanent magnets. In order to reduce the risk of a magnetic short-circuit it is provided that the second axial section, adjacent to the first axial section, includes a first axial subsection with a reduced radial dimension not going beyond the permanent magnets in the first axial section, whereas the axial length of the first axial subsection is smaller than the axial length of the first axial section, and the second axial section, adjacent to its first axial subsection, includes a second axial subsection with a radial dimension larger than the reduced radial dimension of the first axial subsection.

16 Claims, 5 Drawing Sheets

INFERIOR PERMANENT MAGNET ROTOR FOR A REFRIGERANT COMPRESSOR

CROSS-REFERENCE TO RELATED APPLICATION

This application claims priority under 35 U.S.C. § 119(a) of Europe Application No. EP 19191628.7 filed Aug. 14, 2019, the disclosure of which is expressly incorporated by reference herein in its entirety.

FIELD OF THE INVENTION

The present invention relates to an interior permanent magnet rotor, for a drive unit disposed in the interior of a hermetically sealed housing of a refrigerant compressor. The present invention also relates to a refrigerant compressor comprising an interior permanent magnet rotor as well as methods of manufacturing different types of metal sheets for an interior permanent magnet rotor.

The drive unit of a refrigerant compressor normally comprises a piston/cylinder unit for cyclical compression of a refrigerant, and an electric motor to drive the piston/cylinder unit. The electric motor comprises a stator and a rotor, whereas the interior permanent magnet rotor is situated inside the stator.

PRIOR ART

A type of motor that has a rotor embedded with permanent magnets is called IPM (interior permanent magnet) type. So, the permanent magnets are enclosed by material of the rotor which material is not a permanent magnet. Usually the rotor is made of metal, preferably it is made of a multitude of metal sheets oriented normal to the rotor axis. A method to produce different types of metal sheets with a progressive stamping die is shown in US 2016233748 A1. Compared with an SPM (surface permanent magnet) type rotor, the IPM type of motor can reduce the risk of a magnet being peeled off by centrifugal force, and take advantage of reluctance torque. The IPM type allows various structures for embedding permanent magnets.

IPM rotors are for example used in a brushless DC motor called the inner rotor type. The rotor with the permanent magnets is arranged inside while the stator with the electric winding is arranged outside. Compared to the outer rotor type, this inner rotor type motor can be built with rather small diameters and it has a high heat dissipation efficiency. For this reason, an inner rotor type motor is currently used for applications that require a compact and high-output motor with dynamic characteristics. IPM type rotors having an axial section with permanent magnets and another axial section without permanent magnets are known from e.g. US 2002175583 A1 and EP 1261104 A2.

For the rotor of a piston compressor it is desirable to have a large moment of inertia in order to reduce speed variations within one compression cycle due to the varying torque demand of the piston. One possibility would be to add length, like additional metal, to the rotor beyond the part enclosing permanent magnets. For the case of the rotor made of a multitude of metal sheets this would mean to add additional metal sheets without permanent magnets inside on one free face side of the rotor. This, however, can lead to a magnetic short-circuit because the magnetic path in the rotor from radially outside the permanent magnets to the rotor part radially inside the permanent magnets could be closed via the additional metal of the added rotor part carrying no permanent magnets.

OBJECT OF THE INVENTION

It is therefore the object of the invention to provide an IPM rotor for use in a refrigerant compressor which rotor has a higher moment of inertia and at the same time reduces the risk of a magnetic short-circuit.

PRESENTATION OF THE INVENTION

The invention relates to an interior permanent magnet rotor (IPM rotor), for a drive unit disposed in the interior of a hermetically sealed housing of a refrigerant compressor, whereas the rotor comprises a first axial section with permanent magnets, followed by a second axial section without permanent magnets, according to claim 1. The claimed IPM rotor is characterized in that the second axial section comprises, adjacent to the first axial section, a first axial subsection with a reduced radial dimension not going beyond the permanent magnets in the first axial section, whereas the axial length of the first axial subsection is smaller than the axial length of the first axial section, the second axial section comprises, adjacent to its first axial subsection, a second axial subsection with a radial dimension larger than the reduced radial dimension of the first subsection.

The axial length of the second axial subsection will normally be smaller than the axial length of the first axial section, but larger than the axial length of the first axial subsection. The axial length of the second axial subsection could also be larger than the axial length of the first axial section in order to maximize the moment of inertia. However, it has to be safeguarded that the moment of inertia is small enough to be able to start the electric motor and of course the rotor has to fit into the compressor housing.

In axial direction the rotor according to the invention comprises a first axial section with permanent magnets and a second axial section without permanent magnets. The second axial section without permanent magnets has two axial subsections. The first axial subsection, which connects to the first axial section, has—at least around its major part of circumference—a diameter which ends radially inside the permanent magnets of the first axial section. This means that, looking along the axis of the rotor, the first axial subsection of the second axial section must end at the latest before the permanent magnets. In areas of the first axial subsection which do not overlap with permanent magnets the radial dimension can be larger than in areas where there is an overlap with permanent magnets.

The second axial subsection of the second subsection can again have a larger diameter than the first axial subsection of the second subsection which leads to a higher moment of inertia. The second axial subsection can thus in radial direction go beyond the permanent magnets. This is due to the fact that the reduced radial dimension of the first axial subsection acts as an air gap in axial direction so that magnetic flux from radially outside the permanent magnets in the first axial section of the rotor cannot get to the second axial subsection and thus cannot get into the inner part of the first axial section (the part inside the permanent magnets). A magnetic short-circuit is therefore prohibited and the magnetic flux will be forced largely to enter the stator. The larger the axial length of the first axial subsection, which provides the air gap, the smaller the danger of magnetic short-circuit.

The rotor normally is made of several layers of metal sheets, e.g. steel sheet, which are oriented normally to the axis of the rotor. The metal sheets are normally interlocked and need no fixation to one another.

One embodiment of the invention consists in that the radial dimension of the second axial subsection is equal to the radial dimension of the first axial section. This means that the additional axial part (without permanent magnets) of the rotor after the air gap has the same diameter than the axial part with permanent magnets. This allows for a simple production of the rotor since the diameter of the first axial section and the second axial subsection is defined by the same stamping die position. Additionally, in this case the maximum of space, defined by the radius of the first axial section with the permanent magnets, is used to enhance the moment of inertia.

In a preferred embodiment of the invention the contour of the first axial subsection (of the second axial section), as seen in the direction of the axis of the rotor, is a regular polygon. The rotor normally has a circular contour. To reduce the radial dimension one can cut three, four five, six, . . . equal segments (arcs) from this circle which leads to a regular triangle, square, pentagon, hexagon, . . . . This embodiment will be used when the permanent magnets, seen in a section normal to the rotor axis, are even plates (with a rectangular cross section) oriented normal to the radial direction. If the permanent magnets have another form of cross section then the cutouts of the first axial subsection can have the same contour: e.g. if the permanent magnets are curved, then the cutouts will be curved; or if the permanent magnets are arranged in an angle to the radius, the cutouts and thus the contour of the rotor (e.g. its metal sheets) will have respective angles.

In a preferred embodiment of the invention, when the contour of the first axial subsection is a regular polygon, the corners of the regular polygon are at or near fixation means for fixing different parts of the rotor to one another. Since the rotor normally is made of several layers of metal sheet, e.g. steel sheet, these sheets have to be fixed together. Even if the metal sheets are interlocked and thus would not need additional fixation means e.g. a ring plate for holding the permanent magnets in the first axial section has to be fixed to the first axial section as an additional part of the rotor. Fixation means can e.g. be bolts oriented in axial direction and going through several metal sheets of the rotor, especially through all metal sheets of first and second axial section. When seen in a section normal to the axis, these fixation means can be arranged at or near the corners of the polygon.

A preferred embodiment consists in that at least at or near one corner of the regular polygon the contour of the first axial subsection has an enlarged portion going beyond the regular polygon so that this enlarged portion can hold, especially enclose, fixation means for fixing different parts of the rotor to one another. So, the respective metal sheet in this case would have a bore at or near the corner of the polygon and could for this reason deviate from the strict mathematical form of the regular polygon. These enlarged portions are also applicable if the contour of the first axial subsection is not a regular polygon with straight line segments but has another form, e.g. a polygon with curved line segments.

The enlargements at the corner of the regular polygon are needed in case the first and second axial sections consist of a stack of metal sheets produced with a progressive die. The enlargements then must have the same diameter as the first axial section.

In other words, the enlarged portions here are the remaining parts of the first axial section which are used for fixation of the rotor and thus cannot be reduced in radial dimension. There is also no need for reducing since there are no permanent magnets. The radial dimensions can be and have only to be reduced between the fixation means where also permanent magnets are located.

As a rule, the contour of the first axial section of the rotor (containing the permanent magnets), as seen in the direction of the axis of the rotor, is a circle. According to a preferred embodiment of the invention the second axial subsection, as seen in the direction of the axis of the rotor, is also a circle. Since the reduced axial dimensions of the first axial subsection of the second axial section provides for an air gap, the second axial subsection of the second axial subsection needs no cutouts.

In another embodiment of the invention the diameter of a shaft insertion hole in the first axial section is larger than the diameter of the shaft insertion hole in the second axial subsection. This opens the opportunity to mount, e.g. press, the shaft of the drive unit directly onto the second axial section.

In this case it can be provided that the diameter of the shaft insertion hole in a first axial sub-subsection of the first axial subsection, the first axial sub-subsection being adjacent to the first axial section, is the same as in the first axial section. The first axial subsection (with reduced radial dimension) is divided in two sub-subsections, first and second sub-subsection. The first sub-subsection is adjacent to the first axial section (with permanent magnets). So, the radial dimension of the shaft insertion hole in the first axial section (with permanent magnets) is continued in that part of the second axial section (without permanent magnets) which has reduced radial dimensions.

Equally it can be provided that the diameter of the shaft insertion hole in a second axial sub-subsection of the first axial subsection, the second axial sub-subsection being adjacent to the second axial subsection, is the same as in the second axial subsection. The second sub-subsection is adjacent to the second axial subsection (without permanent magnets and without reduced radial dimension). So, the radial dimension of the shaft insertion hole in the second axial subsection (without permanent magnets and without reduced radial dimension) is continued in that part of the second axial section (without permanent magnets) which has reduced radial dimensions.

According to one embodiment of the invention an oil pump is mounted on the free face side of the second subsection. This allows for easy mounting of the oil pump since otherwise the oil pump would have to be mounted e.g. on the shaft of the refrigerant compressor. The oil pump normally is a centrifugal pump immersed in the oil sump of the hermetic compressor. If there are fixation means for fixing different parts of the rotor to one another then these fixation means can also be used to mount the oil pump to the rotor.

The present invention also refers to a refrigerant compressor comprising a hermetically sealed housing and a drive unit disposed in the interior of the housing, the drive unit comprising an electric motor with an interior permanent magnet rotor according to the invention.

The IPM rotor with the enlargement comprising the second axial section has a higher inertia which reduces the speed variation per turn of a piston compressor.

A favorable method of manufacturing different types of metal sheets for an interior permanent magnet rotor according to the invention, in the form of a laminated rotor, comprises that different types are produced with a progressive stamping die. This means that a certain stamping die can be used in a first step for a certain type of metal sheet and another stamping die is then added to cut out additional parts to form another type of metal sheet, and so on.

In one embodiment of the method it is provided that
- in a first step the metal sheets for the second axial subsection are produced,
- in a second step the metal sheets for the first axial section are produced from metal sheets from the first step,
- in a third step the metal sheets for the first axial subsection, especially for the first axial sub-subsection, are produced from metal sheets from the second step.

It is possible that after the first step a metal sheet as a holder plate for the permanent magnets is produced. This holder plates needs a radial dimension large enough to support the permanent magnets at the bottom of the first axial section. So, it has radial dimensions between those of the first axial section and the second axial subsection.

In another embodiment of the method it is provided that
- in a first step the metal sheets for the second axial subsection are produced,
- in a second step the metal sheets for the second axial sub-subsection are produced from metal sheets from the first step,
- in an optional third step metal sheets for the first axial sub-subsection are produced from metal sheets from the second step.

BRIEF DESCRIPTION OF THE FIGURES

The invention will now be explained in greater detail using exemplary embodiments. The drawings are meant as examples and are supposed to present the idea of the invention, but by no means to restrict it or to reproduce it in final manner.

In this regard, the figures show.

WAYS FOR IMPLEMENTATION OF THE INVENTION

Figure 1:
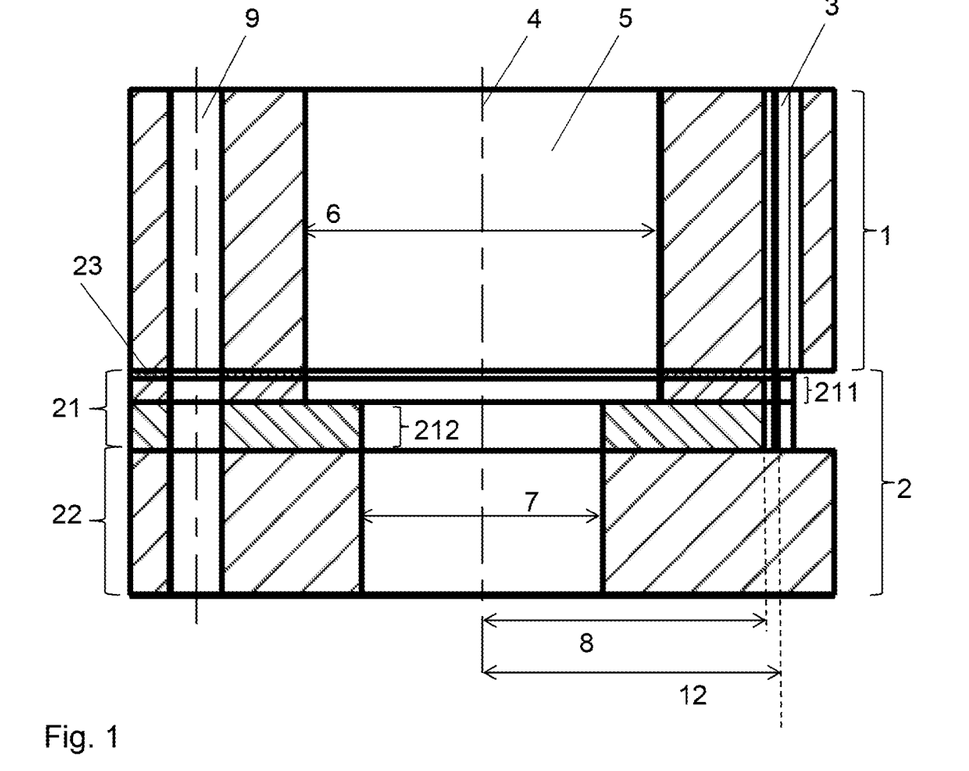
FIG. 1 a longitudinal section of an IPM rotor according to the invention, according to lines A-A in FIG. 2, FIG. 2 a cross section of the IPM rotor of FIG. 1 through the first axial section, FIG. 3 a cross section of the IPM rotor of FIG. 1 at the border between first axial section and second axial section, FIG. 4 another cross section of the IPM rotor of FIG. 1 through the first axial sub-subsection of the first axial subsection of the second axial section, FIG. 5 a cross section of the IPM rotor of FIG. 1 through the second axial sub-subsection of the first axial subsection of the second axial section, FIG. 6 a cross section of the IPM rotor of FIG. 1 through the second axial subsection of the second axial section, FIG. 7 a longitudinal section of the IPM rotor of FIG. 1 according to lines A-A in FIG. 2, with an oil pump, FIG. 8 a perspective view of the IPM rotor of FIG. 7, FIG. 9 a side view of the IPM rotor of FIG. 7, FIG. 10 a top view of the IPM rotor of FIG. 7, FIG. 11 a section through a refrigerant compressor with a rotor according to the invention.
Figure 2:
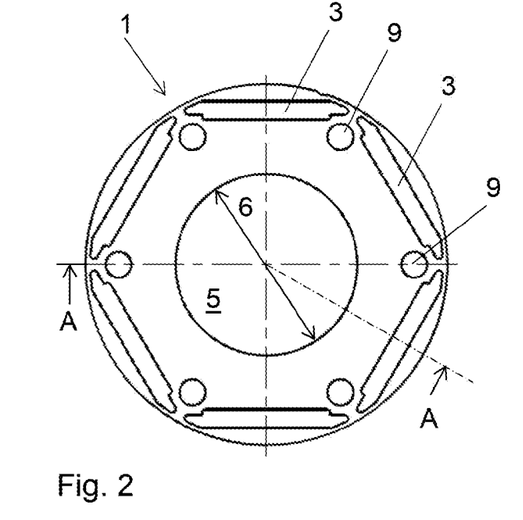

FIG. 1 shows a longitudinal section of an IPM rotor according to the invention, according to lines A-A in FIG. 2. In FIG. 1 the IPM rotor is shown without fixation means 16 and without permanent magnets 20.

The rotor comprises a first axial section 1 with recesses 3 for permanent magnets. The recesses 3 are oriented parallel to the axis 4 of the rotor. The diameter 6 of the shaft insertion hole 5 in first axial section 1 is larger than the diameter 7 of the shaft insertion hole 5 in the lower part of second axial section 2, i.e. larger than the diameter 7 in the second axial subsection 22.

The second axial section 2 of the IPM rotor is situated adjacent to the first axial section 1. The second axial section 2 is divided in a first axial subsection 21 with a reduced radial dimension 8 as compared to first axial section 1. The reduced radial dimension 8 ends before the axial projection of the recess 3 in first axial section 1. The axial length of the first axial subsection 21 is smaller than the axial length of the first axial section 1. The axial length of the first axial subsection 21 is also smaller than the axial length of the second axial subsection 22. The axial length of the second axial subsection 22 here is smaller than the axial length of the first axial section 1. Normally, as here, the axial length of the first axial section 1 is larger than the axial length of the second axial section 2. The air gap provided by the first axial subsection 21 can be dimensioned such that the permeability of the air gap between rotor and stator is bigger compared to the permeability of the air gap in the first axial subsection 21.

The second axial subsection 22 has a radial dimension larger than the reduced radial dimension 8 of the first axial subsection 21. Here the radial dimension of the second axial subsection 22 is equal to the radial dimension of the first axial section 1.

The diameter 6 of the shaft insertion hole 5 in the first axial sub-subsection 211 of the first axial subsection 21, which axial sub-subsection 211 is adjacent to the first axial section 1, is the same as in the first axial section 1. The diameter of the shaft insertion hole 5 in the second axial sub-subsection 212 of the first axial subsection 21, which second axial sub-subsection 212 is adjacent to the second axial subsection 22, is the same as in the second axial subsection 22.

Several bores 9 for fixation means are running in axial direction through first and second axial sections 1,2.

FIG. 2 shows a cross section of the IPM rotor of FIG. 1 through the first axial section 1. Since the IPM rotor in this example is a laminated rotor, i.e. is made of single metal sheets oriented normal to the axis 4 of the rotor, this cross section in fact shows a view of one such metal sheet. One can see the six recesses 3 for the permanent magnets, the six bores 9 for the fixation means and the shaft insertion hole 5. Each recess 3 resembles a rectangle with the longer sides normal to the radius.

Figure 3:
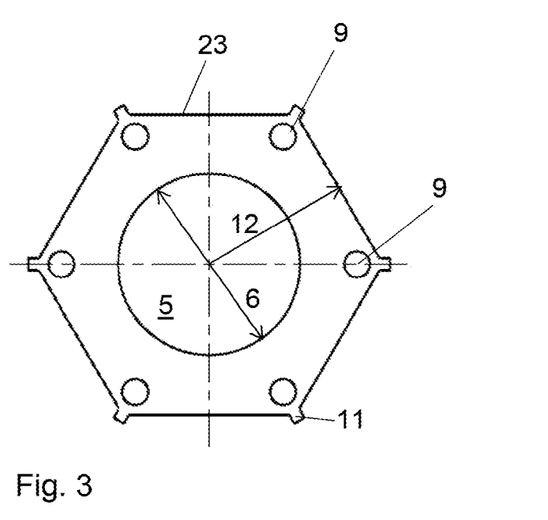

FIG. 3 shows a cross section of the IPM rotor of FIG. 1 at the border between first axial section 1 and second axial section 2. Again, this is in fact a view of one metal sheet. The contour of this metal sheet, which acts as a holder plate 23 for the permanent magnets 20 (see FIG. 7), is basically a regular hexagon. Each bore 9 is situated close to a corner 10 of the hexagon. The bore 9 is situated in the last quarter of the radial dimension of the hexagon. At the corner 10 the metal sheet has an enlarged portion 11 going beyond the hexagon. The radial dimension until the end of this enlarged portion 11 here is equal to the radius of the circular metal sheet of FIG. 2, i.e. the radius of first axial section 1. The holder plate 23 acts as a support for the permanent magnets 20 in recesses 3. The radial dimension 12 of the hexagon thus has to be still larger than that of the metal sheets of the first axial subsection 21 of FIG. 4.

Figure 4:
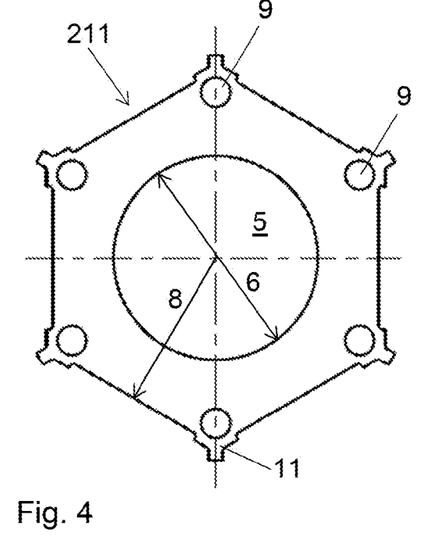

FIG. 4 shows another cross section of the IPM rotor of FIG. 1 through the first axial sub-subsection 211 of the first axial subsection 21 of the second axial section 2. Again, this is a view of one metal sheet of the several metal sheets that constitute the first axial sub-subsection 211. The contour of this metal sheet is basically a regular hexagon. Each bore 9 is situated close to a corner 10 of the hexagon. The bore 9 is situated in the last quarter of the radial dimension of the hexagon. At the corner 10 the metal sheet has an enlarged portion 11 going beyond the hexagon. The radial dimension until the end of this enlarged portion 11 here is equal to the radius of the circular metal sheet of FIG. 2, i.e. the radius of first axial section 1. The reduced radial dimension 8 of the hexagon is still smaller than the radial dimension 12 of the hexagon of the metal sheet of FIG. 3. The radial dimension 8 is such that the sides of the hexagon do not radially overlap with the permanent magnets 20 or the recesses 3. In other words, the straight sides of the hexagon are further inside when compared to those of FIG. 3.

The radial dimension at this enlarged portion 11 here is equal to the radius of the circular metal sheet of FIG. 2, i.e. the radius of first axial section 1.

In other words, in areas of the metal sheet of FIG. 4 which do not overlap with permanent magnets the radial dimension can be larger than in areas where there is an overlap with permanent magnets. The form of the enlarged portion 11 here is equal to the respective part of the metal sheet of FIG. 2 due to the production of the metal sheets with a progressive stamping die.

The metal sheets of FIG. 2-4 have the same diameter 7 of the shaft insertion hole 5. The metal sheets of FIG. 5-6 have a smaller diameter 6 of the shaft insertion hole 5.

Figure 5:
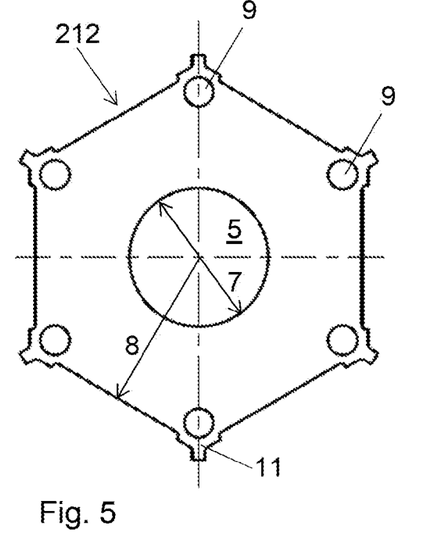

FIG. 5 shows a cross section of the IPM rotor of FIG. 1 through the second axial sub-subsection 212 of the first axial subsection 21 of the second axial section 2. Again, this is a view of one of several metal sheets of this second axial sub-subsection 212. The metal sheet of FIG. 5 differs from that of FIG. 4 only in its diameter 7 of the shaft insertion hole 5. The diameter 7 is dimensioned such that the shaft of the drive unit can be press-fitted into the part of the shaft insertion hole 5 with the smaller diameter 7.

Figure 6:
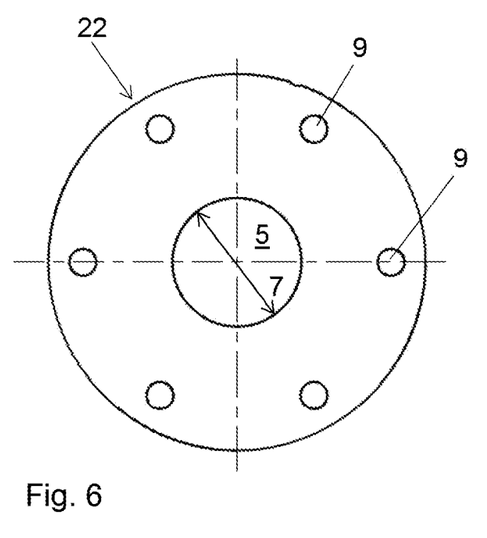

FIG. 6 shows a cross section of the IPM rotor of FIG. 1 through the second axial subsection 22 of the second axial section 2. Again, this is a view of one of several metal sheets of this second axial subsection 22. The contour of the metal sheet is a circle, its radius can be larger than that of the metal sheet in FIGS. 4 and 5 since the second axial subsection 2 is away far enough from the first axial section 1 containing the permanent magnets. In this case the radius is the same as of the metal sheets of FIG. 2.

Since the radial dimensions of the different types of metal sheets according to FIG. 2-6 differ it is possible to manufacture them with a progressive stamping die. The metal sheets are interlocked. This is done during the stamping of the stack in the progressive die.

One possibility for using a progressive stamping die is that in a first step the metal sheets for the second axial subsection 22 are produced, with the bores 9 only, see FIG. 6, then in a second step the metal sheets for the first axial section 1 are produced from metal sheets from the first step, i.e. the recesses 3 are added and the shaft insertion hole 5 is enlarged to diameter 6, see FIG. 2. In a third step the metal sheets for the first axial sub-subsection 211 are produced from metal sheets from the second step, i.e. the parts outside the recesses 3 are cut away, see FIG. 4.

To obtain the holder plate 23, see FIG. 3, one has to take a metal sheet after the first (FIG. 6) and make six cutouts to receive the approximately hexagonal shape with a radial dimension 12, see FIG. 3, which radial dimension 12 radially ends approximately in the middle of the recesses 3 to be able to hold the permanent magnets 20.

Another possibility to use progressive stamping is that in a first step the metal sheets for the second axial subsection 22 are produced, see FIG. 6, then in a second step the metal sheets for the second axial sub-subsection 212 are produced from metal sheets from the first step, i.e. the approximately hexagonal form with reduced radial dimension 8 is produced, see FIG. 5, then in an optional third step metal sheets for the first axial sub-subsection 211 are produced from metal sheets from the second step, i.e. the shaft insertion hole 5 is enlarged from diameter 7 to diameter 6, see the result in FIG. 4.

The metal sheets are interlocked. This is done during the stamping of the stack in the progressive die.

Figure 7:
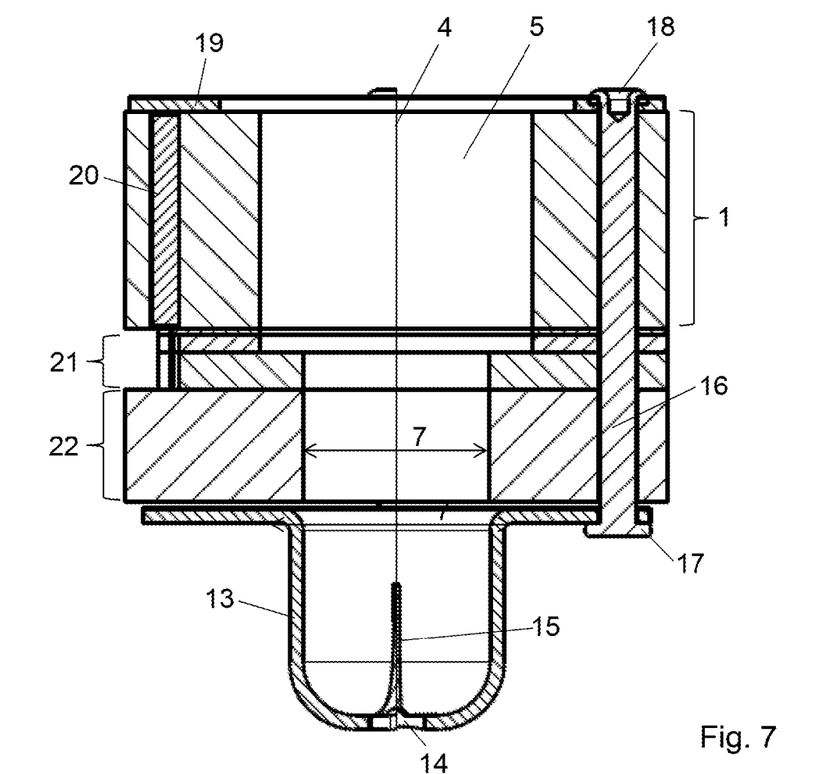

FIG. 7 shows a longitudinal section of the IPM rotor of FIG. 1 according to lines A-A in FIG. 2, now with an oil pump 13 mounted on the rotor. The oil pump 13 has a hollow cylindric portion which is closed on its lower side except for an opening 14 through which oil can get inside the oil pump 13. The cylindric portion has the same inner diameter as the adjacent portion of the shaft insertion hole 5 with its diameter 7. Inside the oil pump 13, emerging from its bottom, is an asymmetric guiding element 15. The hollow cylindric portion opens up into a flat circular ring with similar dimensions as the metal sheets of the second subsection 22 (see FIG. 6). The circular ring lies flat on the free face side of the second axial (sub)section 2 or 22, respectively. This has the advantage that the oil pump 13 can be mounted to the rotor with the same fixation means which are used to fix different parts of the rotor together. Here the fixation means are bolts 16 with heads 17 on the side of the second axial section 2, which bolts 16 are secured by rivets 18 on the side of the first axial section 1. The heads 17 press the circular ring of the oil pump 13 against the free face side of the second axial subsection 22.

On the free face side of the first axial section 1 there is a circular ring plate 19 which is part of the rotor and which secures the permanent magnets 20 in their place in the recesses 3. The circular ring plate 19 is also secured by the bolts 16 and rivets 18. The circular ring plate 19 is made of non-magnetic material.

Figure 8:
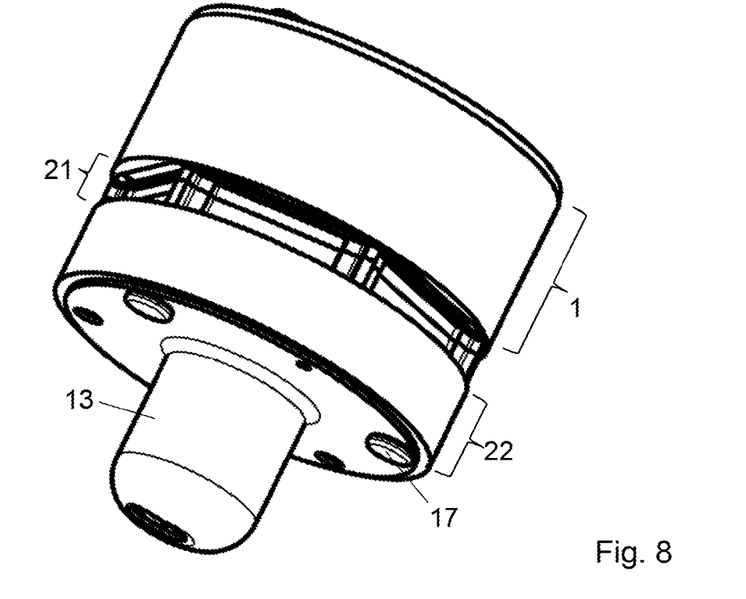

FIG. 8 shows a perspective view of the IPM rotor of FIG. 7. One can see the heads 17 of the bolts 16 and the hexagonal form of the first axial subsection 21.

Figure 9:
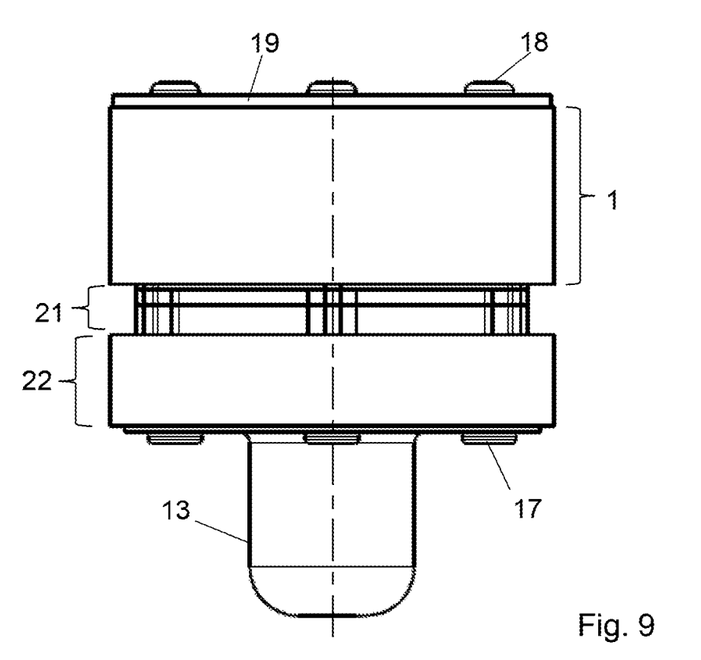

FIG. 9 shows a side view of the IPM rotor of FIG. 7.

Figure 10:
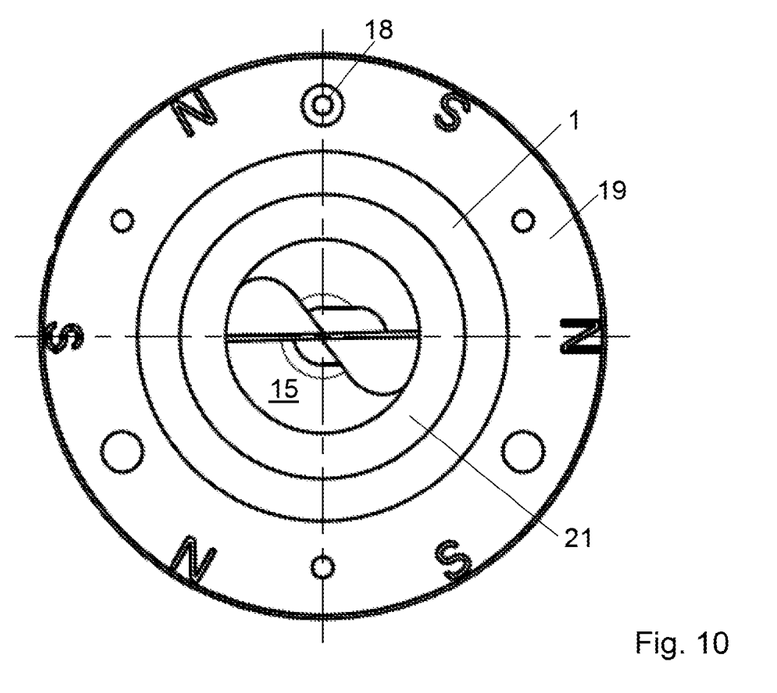

FIG. 10 shows a top view of the IPM rotor of FIG. 7. Since the shaft is not yet pressed into the shaft insertion hole 5 one can see the asymmetric guiding element 15 inside the oil pump 13.

Figure 11:
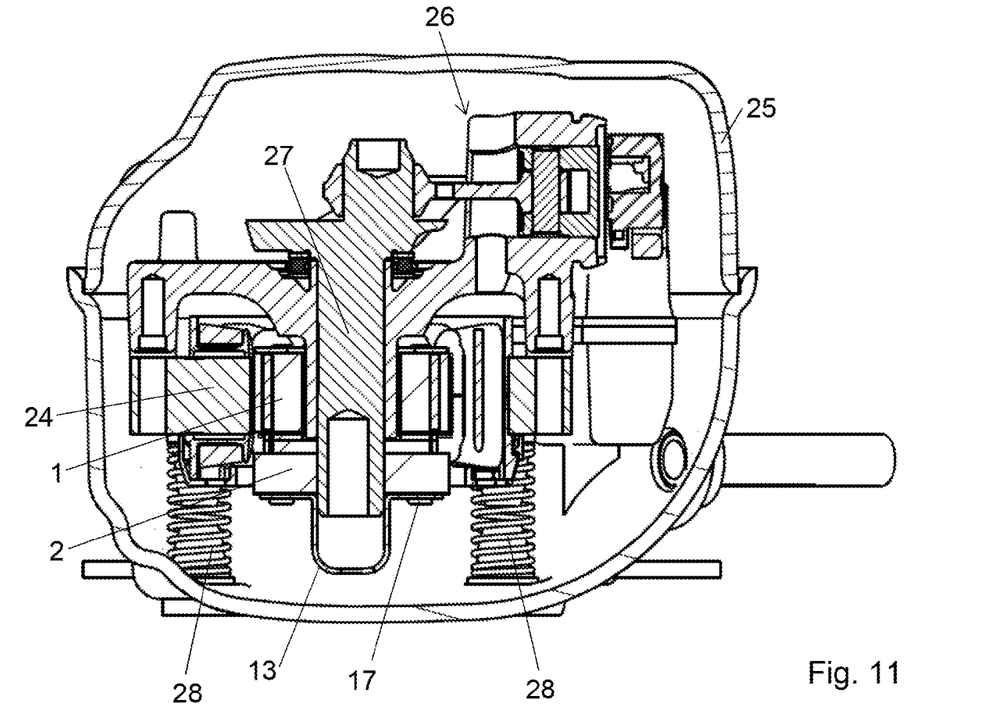

A possible embodiment of a refrigerant compressor with a rotor according to the invention is shown in FIG. 11. The refrigerant compressor has a hermetically sealed housing 25, as well as a drive unit disposed in the interior of the housing 25, having a piston/cylinder unit 26 for cyclical compression of a refrigerant, and an electric motor for drive of the piston/cylinder unit 26. The electric motor comprises a stator 24 and a rotor within the stator, the IPM rotor comprising a first and a second axial section 1,2 and the IPM rotor being connected with the shaft 27 and the shaft 27 being connected to the piston/cylinder unit 26. At its base the drive unit is connected to the hermetically sealed housing 25 via spring elements 28.

LIST OF REFERENCE SYMBOLS 1 first axial section
2 second axial section
3 recess for a permanent magnet
4 axis of the rotor
5 shaft insertion hole
6 diameter of shaft insertion hole 5
7 diameter of shaft insertion hole 5
8 reduced radial dimension
9 bore for fixation means
10 corner of metal sheet
11 enlarged portion
12 radial dimension
13 oil pump
14 opening
15 asymmetric guiding element
16 bolt (fixation means)
17 head of bolt 16
18 rivet
19 circular ring plate
20 permanent magnet
21 first axial subsection of second axial section 2
22 second axial subsection of second axial section 2
23 holder plate
24 stator
25 housing
26 piston/cylinder unit
27 shaft
29 spring element
211 first axial sub-subsection of first axial subsection of second axial section 2
212 second axial sub-subsection of first axial subsection of second axial section 2

The invention claimed is:

1. An interior permanent magnet rotor for a drive unit disposed in an interior of a hermetically sealed housing of a refrigerant compressor, the interior permanent magnet rotor comprising:
a first axial section with permanent magnets, followed by a second axial section without permanent magnets;
the second axial section comprising, adjacent to the first axial section, a first axial subsection with a reduced radial dimension not going beyond the permanent magnets in the first axial section, whereas an axial length of the first axial subsection is smaller than an axial length of the first axial section;
the second axial section comprises, adjacent to its first axial subsection, a second axial subsection with a radial dimension larger than the reduced radial dimension of the first axial subsection.

2. The interior permanent magnet rotor according to claim 1, wherein:
the radial dimension of the second axial subsection is equal to a radial dimension of the first axial section.

3. The interior permanent magnet rotor according to claim 1, wherein:
a contour of the first axial subsection, as seen in a direction of an axis of the rotor, is a regular polygon.

4. The interior permanent magnet rotor according to claim 3, wherein:
corners of the regular polygon are at or near fixation elements for fixing different parts of the rotor to one another.

5. The interior permanent magnet rotor according to claim 3, wherein:
at least at or near one corner of the regular polygon the contour of the first axial subsection has an enlarged portion going beyond the regular polygon so that the enlarged portion encloses fixation elements for fixing different parts of the rotor to one another.

6. The interior permanent magnet rotor according to claim 1, wherein:
a contour of the second axial subsection, as seen in a direction of an axis of the rotor, is a circle.

7. The interior permanent magnet rotor according to claim 1, wherein:
a diameter of a shaft insertion hole in the first axial section is larger than a diameter of the shaft insertion hole in the second axial subsection.

8. The interior permanent magnet rotor according to claim 1, wherein:
a diameter of a shaft insertion hole in a first axial sub-subsection of the first axial subsection, the first axial sub-subsection being adjacent to the first axial section, is the same as in the first axial section.

9. The interior permanent magnet rotor according claim 1, wherein:
a diameter of a shaft insertion hole in a second axial sub-subsection of the first axial subsection, the second axial sub-subsection being adjacent to the second axial subsection, is the same as in the second axial subsection.

10. The interior permanent magnet rotor according to claim 1, wherein:
an oil pump is mounted on a free face side of the second subsection.

11. A refrigerant compressor comprising:
a hermetically sealed housing and a drive unit disposed in an interior of the housing, the drive unit comprising an electric motor with an interior permanent magnet rotor according to claim 1.

12. A method of manufacturing different types of metal sheets for an interior permanent magnet rotor according to claim 1, in a form of a laminated rotor, the method comprising:
producing the different types with a progressive stamping die;
producing metal sheets for the second axial subsection;
producing metal sheets for the first axial section from the metal sheets for the second axial subsection;
producing metal sheets for the first axial subsection from the metal sheets for the first axial section.

13. The method according to claim 12, wherein:
after the metal sheets for the second axial subsection are produced, the method further comprising producing a metal sheet as a holder plate for the permanent magnets.

14. A method of manufacturing different types of metal sheets for an interior permanent magnet rotor according to claim 1, in a form of a laminated rotor, the method comprising:
producing the different types with a progressive stamping die;
producing metal sheets for the second axial subsection;
producing metal sheets for a second axial sub-subsection from the metal sheets for the second axial subsection;
wherein a diameter of a shaft insertion hole in the second axial sub-subsection of the first axial subsection, the second axial sub-subsection being adjacent to the second axial subsection, is the same as in the second axial subsection.

15. The method according to claim 14, further comprising:
  producing metal sheets for a first axial sub-subsection from the metal sheets for the second axial sub-subsection;
  wherein a diameter of a shaft insertion hole in the first axial sub-subsection of the first axial subsection, the first axial sub-subsection being adjacent to the first axial section, is the same as in the first axial section.

16. The method according to claim 12, further comprising:
  producing metal sheets for a first axial sub-subsection from the metal sheets for the first axial section;
  wherein a diameter of a shaft insertion hole in the first axial sub-subsection of the first axial subsection, the first axial sub-subsection being adjacent to the first axial section, is the same as in the first axial section.

* * * * *